(12) United States Patent
Patterson et al.

(10) Patent No.: US 7,469,955 B2
(45) Date of Patent: Dec. 30, 2008

(54) ROTATABLY-MOUNTABLE BUMPER AND METHOD FOR CUSHIONING CONTACT BETWEEN A VEHICLE HOOD AND GRILL

(75) Inventors: Derek L. Patterson, Shelby Township, MI (US); David P. Zink, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/754,519

(22) Filed: May 29, 2007

(65) Prior Publication Data

US 2008/0296931 A1 Dec. 4, 2008

(51) Int. Cl.
*B60J 7/00* (2006.01)
(52) U.S. Cl. .............. 296/187.03; 296/193.11
(58) Field of Classification Search ............ 296/187.03, 296/187.09, 193.11, 203.02, 187.04; 293/155; 180/69.2
See application file for complete search history.

(56) References Cited

U.S. PATENT DOCUMENTS

| | | | | |
|---|---|---|---|---|
| 3,663,048 A * | 5/1972 | Zimmerle | ............ | 293/155 |
| 4,597,603 A * | 7/1986 | Trabert | ............ | 296/193.1 |
| 5,046,768 A * | 9/1991 | Myslicki | ............ | 292/68 |
| 5,466,035 A * | 11/1995 | Klages et al. | ............ | 296/187.09 |
| 5,557,829 A * | 9/1996 | Schoen et al. | ............ | 16/375 |
| 5,988,305 A * | 11/1999 | Sakai et al. | ............ | 296/187.04 |
| 6,447,049 B1 * | 9/2002 | Tohda et al. | ............ | 296/187.04 |
| 6,676,179 B2 * | 1/2004 | Sato et al. | ............ | 293/115 |
| 6,676,197 B2 * | 1/2004 | Ozawa | ............ | 296/187.03 |
| 6,868,930 B2 * | 3/2005 | Brogly et al. | ............ | 180/69.2 |
| 7,052,079 B2 * | 5/2006 | Endo et al. | ............ | 296/193.11 |
| 7,055,894 B2 * | 6/2006 | Ikeda et al. | ............ | 296/187.09 |
| 7,270,367 B2 * | 9/2007 | Mairing | ............ | 296/193.11 |

* cited by examiner

*Primary Examiner*—Kiran B. Patel (57) ABSTRACT

Disclosed is a rotatably-mountable bumper configured for rotatably and ergonomically mounting to a mounting member for cushioning the contact between the mounting member and a potentially interfering member. The bumper transmits reactive forces between two members, such as a vehicle hood and grille, if portions of one member over travels. A fastening member on the bumper rotatably engages an aperture on the mounting member to secure the bumper to the mounting member. A registration member on the bumper retentively holds the bumper in rotatably-mounted engagement with the mounting member.

3 Claims, 6 Drawing Sheets

ROTATABLY-MOUNTABLE BUMPER AND METHOD FOR CUSHIONING CONTACT BETWEEN A VEHICLE HOOD AND GRILL

TECHNICAL FIELD

The present invention provides a rotatably and ergonomically mountable bumper to cushion and transmit reactive forces between two members, such as a vehicle hood and grille, preventing contact if one member over travels.

BACKGROUND OF THE INVENTION

Vehicles typically have movable hinged parts such as a hood and trunk lid. The hood is typically opened to provide access to the engine compartment of the vehicle for inspection, regular preventative maintenance as well as more serious repairs. When closing the hood, it is typical to allow the hood to close under its own weight or to provide additional closing force to the hood causing the hood to "slam" rather than to gently close. In some cases, the hood must be slammed closed to cause the hood latch mechanism to engage and latch the hood in the closed position. A fortuitously-placed spring is typically provided and positioned to absorb a portion of the shock energy of the slamming hood.

A vehicle hood is typically a movable vehicle body panel characterized by a length and width that are much greater that the panel thickness. The vehicle hood is generally assembled from stamped and formed sheet metal panels and will typically tend to flex to some extent when it is abruptly closed. In cases where the dimensional tolerances between the hood and other body panels are tight enough and the hood is slammed closed, portions of the hood may flex or reactively deform enough to allow the hood to directly contact other vehicle components such as a show surface of a vehicle grille where contact is not intended by design. The continuing drive for higher quality and closer tolerances between vehicle body components may result in a reduction in the gap or spacing between the hood and other vehicle body components, improving overall vehicle body appearance while possibly increasing the likelihood of unintended contact between, for example, the vehicle hood and grille when the hood is slammed closed.

SUMMARY OF THE INVENTION

The present invention provides a rotatably and ergonomically-mountable bumper configured for cushioning the contact between a mounting member, such as a vehicle hood, and a potentially interfering second member, such as a vehicle grille.

The rotatably-mountable bumper engages a mounting aperture provided on a first surface of the mounting member. The bumper includes a fastening member rotatable about the mounting aperture between a first position of rotation in which the mounting member disengages from the mounting aperture of the moving member and a second position in which the fastening member engageably mounts the bumper to the mounting aperture of the moving member. The bumper includes a body having two opposing ends and having the fastening member secured to the body at an intermediate position between the two opposing ends. A cushioning pusher member is secured to the body near one of the ends of the body. The pusher member is configured to contact a portion of the potentially interfering second member to transmit reactive forces between the mounting member and the second member thereby preventing the mounting member from directly impacting the potentially interfering member. The bumper has elasticity to cushion the impact and to absorb a portion of the energy of the impact.

According to one aspect of the invention, the mounting member is a vehicle hood and the potentially interfering second member is a vehicle grille.

According to another aspect of the invention, the bumper includes a registration member and the mounting member includes a complimentary registration feature positioned and configured to retentively engage the registration member wherein the action of the registration member and registration feature act to rotatably lock rotation of the bumper in the aperture to maintain the bumper in a mounted and properly aligned position.

According to another aspect of the invention, the fastening member includes a shank portion having a first end secured to the bumper body. A head portion of the bumper is secured to the shank portion at an end of the shank opposite the bumper body. The head portion is sized and configured to be insertable into the mounting aperture when the fastening member is positioned in the aperture at the first position. The mounting aperture extends from the first surface through a second surface of the movable member where the second surface is spaced apart from the first surface. The length of the shank portion of the fastening member is chosen to be sufficient to permit the head portion of the fastening member to extend through the mounting aperture to rotatably engage against the second surface such that the head portion may be brought into retentive engagement with the second surface. The head portion of the fastening member is sized and configured to retentively engage the second surface when the fastening member is in the second position.

According to another aspect of the invention, the head portion and shank portion of the bumper together with the mounting aperture are aligned to a first axis wherein a peripheral shape of the head portion normal to the first axis substantially matches a shape of the mounting aperture when the fastening member is in the first position, thereby allowing the head portion to enter and pass through the aperture. Additionally, the peripheral shape of the shank portion normal to the first axis has a width less than the width of the aperture such that the shank portion can freely rotate in the aperture between the first and second positions such that the bumper can be rotatably engaged or disengaged from the mounting member.

According to another aspect of the invention, a lip is formed on the body of the bumper at a position proximate to the second end of the body (i.e., opposite the pusher). The lip is configured to tension the shank and head within the mounting aperture of the moving member when the fastening member is in the second position.

According to another aspect of the invention, a detent is provided for positioning and holding the fastening member and bumper in the second position. The detent includes a hole formed into one of the set consisting of the mounting member and the bumper body. A protrusion member is secured to the remaining member of the set. The socket is formed to generally conform to the shape of the protrusion member. The protrusion member and socket are aligned so as to retentively engage when the fastening member is in the second position to maintain the fastening member and bumper in the second position relative to the mounting aperture.

According to another aspect of the invention, a complementary portion of the bumper body has a surface complementary to a surface of the mounting member wherein the complimentary portion is shaped and configured to contact a portion of the mounting member so as to compressively lock the bumper into the second position by communication of compressive force between the shank/aperture and complimentary portion of the body.

According to another aspect of the invention, the mounting aperture is a slot having an oblong shape.

According to another aspect of the invention, the mounting aperture is a slot having a substantially elliptical shape.

According to another aspect of the invention, the head portion and the shank portion are made of an elastomeric material.

According to another aspect of the invention, the mounting member is a hood of a vehicle. The potentially interfering member is a vehicle engine compartment grille. The pusher member is configured to contact a portion of a vehicle grille, wherein a reactive force is transmitted through the bumper between the grille and the hood, the cushioning force acting to prevent the hood from contacting the grille when the hood is slammed closed.

According to another aspect of the invention, a method is disclosed for rotatably and ergonomically mounting a bumper to a mounting member.

According to another aspect of the invention, a method is disclosed for preventing a vehicle hood from contacting a vehicle grille when the vehicle hood is slammed closed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
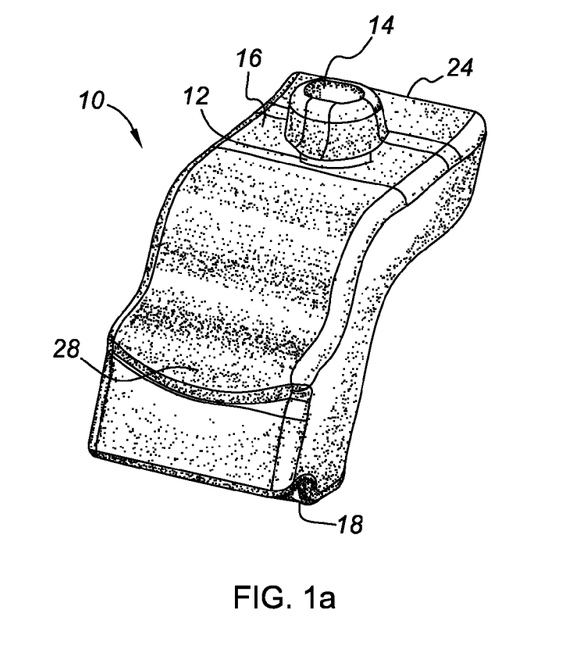
FIG. 1a illustrates a front perspective view of a first embodiment of the rotatably mountable bumper consistent with the present invention.

FIG. 1a illustrates a front perspective view of a first embodiment of the rotatably mountable bumper 10 consistent with the present invention. The bumper 10 includes a fastening member having a shank portion 12 and a head portion 14. The shank portion 12 is secured on one end to a bumper body 16, and an opposing end of the shank portion 12 is secured to the head portion 14. In the embodiment depicted in FIG. 1a, the shank portion 12 has a generally cylindrical shape and the head portion 14 has a generally oblong or elliptical shape. The shape of the head portion 14 is chosen such that the head may be aligned to insert into an aperture such as a slot as will be discussed further below. The rotatably-mountable bumper 10 has a pusher member 18 formed onto or secured to one end of the body 16. A biasing member such as an elastomeric lip 24 is formed or secured to an end of the body 16 opposite the pusher member 18. The lip 24 is configured to bias against the mounting member (shown and discussed with FIGS. 2b, 3a and 3b below). The lip 24 is configured and adapted to be elastically deformable when a sufficient force is applied and to responsively apply a reactive force generated by the deformation of the lip end of the body so as to bias the bumper body 16 and pusher member 18 against the mounting member (shown and discussed later). The rotatably-mountable bumper further includes a registration member 28. The registration member 28 is discussed in more detail below in sections discussing FIGS. 2b, 3a and 3b. The components of bumper 10 may be formed from an elastic material or from a combination of elastic and non-elastic materials. Nevertheless, it is preferred that at least the lip 24 and the pusher member 18 have elasticity such that the lip is deformable to bias the bumper body 16 and pusher member 18, and the pusher member 18 is elastically deformable to cushion contact between the pusher member 18 and another object.

Figure 1B:
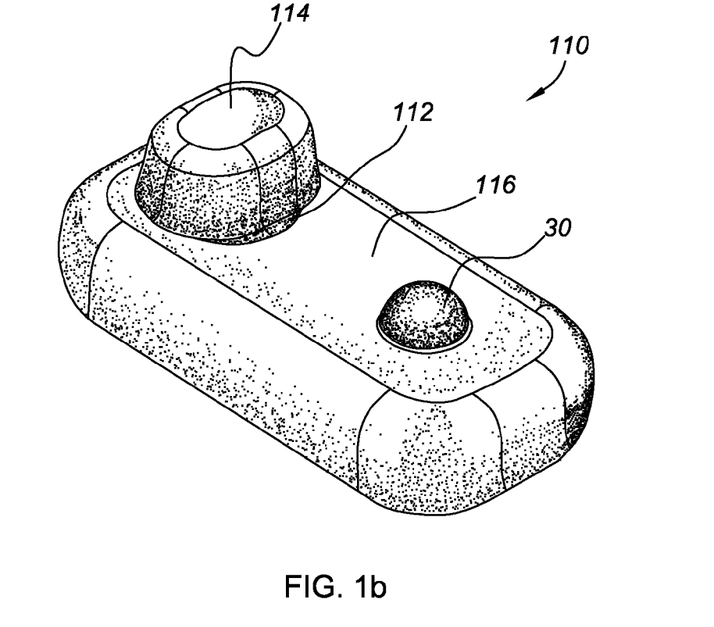
FIG. 1b illustrates an alternate registration member for a rotatably mountable bumper as would be applicable to the bumper illustrated in FIG. 1a consistent with the present invention.

FIG. 1b illustrates an alternate registration member 30 for a rotatably-mountable bumper as would be applicable to the bumper 10 illustrated in FIG. 1a to replace or assist the registration member 28 depicted in FIG. 1a. The alternate registration member 30 illustrated in FIG. 1b is a generally hemispherical protrusion member secured to the body 116. The body 116 rotates about the fastening member consisting of a shank portion 112 secured on one end to the body 116. An opposing end of the shank portion 112 is secured to the head portion 114. As in FIG. 1a, the shank portion 112 has a cylindrical shape and the head portion 114 has a generally oblong or elliptical shape. The alternate registration member 30 is not limited to the use of the exemplary illustrated hemispherical protrusion member, but may instead utilize any suitable variety of detent mechanism to releasably hold the rotary alignment of the bumper 110 in a desired position as would be known to one skilled in the art.

Figure 2A:
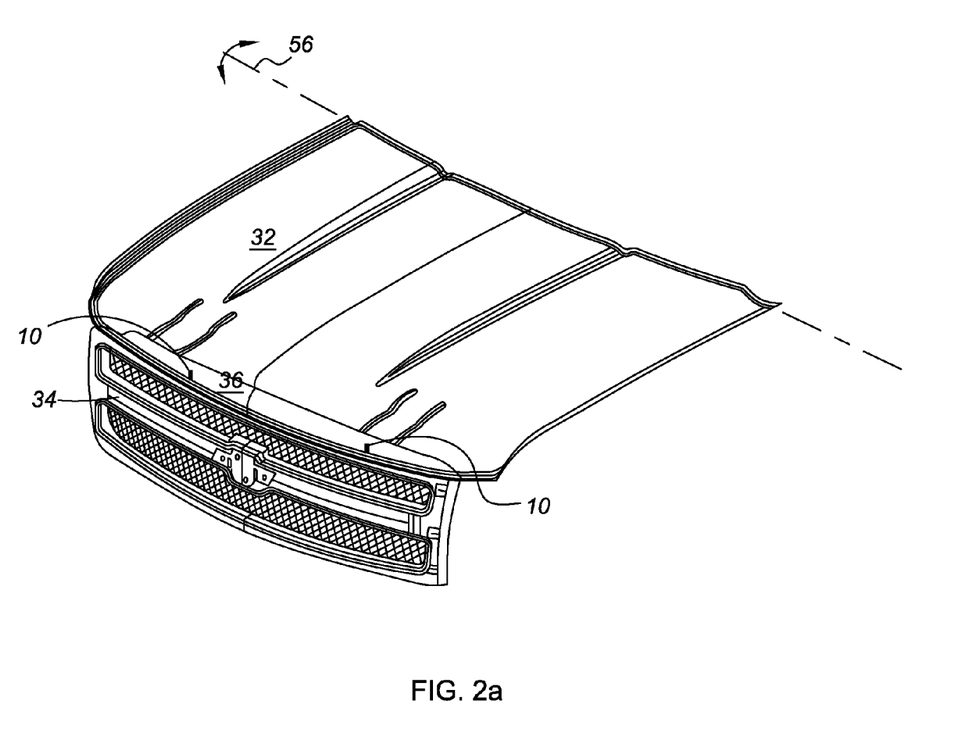
FIG. 2a illustrates a perspective view of a vehicle hood and grille with two of the rotatably mounted bumpers depicted in FIG. 1 secured to a front portion of the hood so as to contact the grille in phase with the hood when the hood transitions to a closed position, consistent with the present invention.

FIG. 2a illustrates a partially assembled perspective view of a vehicle hood 32 and grille 34 with two of the rotatably mounted bumpers 10 of FIG. 1 spaced apart and secured to a front portion 36 of the hood 32 so as to contact the grille 34 when the hood 32 closes or slams to a position within proximity of the grille 34, thereby preventing the front portion 36 from directly contacting the grille 34. The vehicle hood 32 is configured to pivot about an axis 56 between an open and a closed position.

Figure 2B:
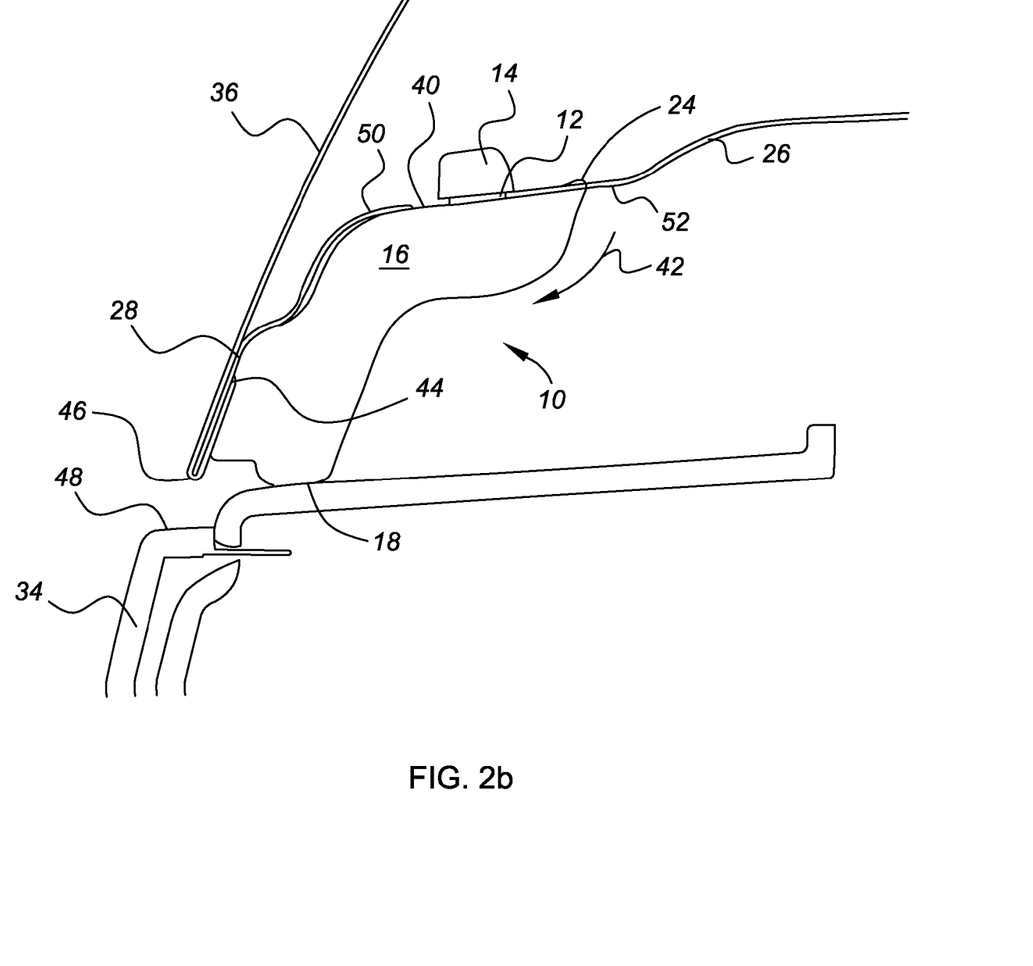
FIG. 2b illustrates a sectional view of the interface between the vehicle hood and grille with the rotatably mounted bumper of FIG. 1a secured to an inner hood panel consistent with the present invention.

FIG. 2b illustrates a sectional view showing the interface between the front portion 36 of the vehicle hood 32 (see FIG. 2a) and grille 34 with the rotatably-mounted bumper 10 of FIG. 1 secured to a hood inner panel 26 consistent with the present invention. The bumper 10 is shown rotatably mounted to the hood inner panel 26 mounting aperture 40 by way of the head portion 14 having been inserted into the mounting aperture or slot 40 and then rotated along with the body 16 about the interface between the shank portion 12 and the mounting aperture or slot 40 to the second position in which the oblong or elliptical head portion 14 is aligned substantially crosswise to an elongated length of the mounting aperture or slot 40. The biasing member in FIG. 2b is the lip 24 shown in its non-elastically deformed state interfering with hood inner panel 26. With the bumper 10 in the position illustrated, the lip 24 would be elastically deformed by contact with the hood inner panel 26 and would not protrude through the hood inner panel 26 as illustrated by FIG. 2b. The deformation of the lip 24 against the hood inner panel 26 generates a reactive force at the interface between the hood inner panel 26 and the lip 24. This reactive force applied to the body 16 generates a torque about a pivot point defined by the rotatably mounted fastening member (shank portion 12 and head portion 14) and the slot 40 thereby tending to shift or incline the bumper body 16 in a bias torque direction 42. This bias torque direction 42 urges the registration member 28 (see FIG. 1a) firmly against the registration feature (third surface 44) shaped and adapted to mate in a complimentary fashion and thereby to retentively register the alignment of the rotatably-mountable bumper 10 in the second position (in which the head portion 14 of the bumper engages with the hood inner panel 26 through the slot 40). The bumper 10 includes a cushioning pusher member 18 secured to an end of the bumper body 16. The pusher member 18 is shaped, configured and positioned to contact and transfer reactive forces between the front portion 36 of the vehicle hood 32 (see FIG. 2a) and the vehicle grille 34 as the vehicle hood 32 is closing, thereby preventing the leading edge 46 of the hood 32 (see FIG. 2a) from contacting the show surface 48 of the grille 34.

Additionally as can be seen in FIG. 2b, the shape of the bumper body 16 and the location of the shank portion 12 on the bumper body 16 forces the shank portion 12 against a rear wall of the slot 40. The shank portion 12 compressively locks the bumper 10 into the second position by communication of compressive forces between the rear wall of the slot 40 and the registration feature 44 of the registration member 28 through the bumper 10. This occurs due to the advantageously chosen location of the slot 40 in a position closer to the front portion 36 of the vehicle hood than the dimensions of the bumper body 16 would require, forcing the shaft portion 12 against the rear wall of the slot 40 and causing the shaft portion 12 to elastically deflect to a small degree when the bumper body 16 is in the second position. These compressive forces together with the torque about the pivot point as discussed earlier act together to tightly secure the bumper 10 to the hood inner panel 26 and lock the bumper 10 into the illustrated second position.

The rotatably-mountable bumper 10 advantageously permits tighter design tolerances in the spacing between the leading edge 46 of the front portion 36 of the hood 32 and the show surface 48 of the grille 34 when the vehicle hood 32 is in the closed position (illustrated in FIG. 2b). The mounting member (in FIG. 2b hood inner panel 26) has a first surface 52 facing the bumper body 16 and a spaced opposing second surface 50 having a slot 40 through which the head portion 14 protrudes to engageably mount the bumper 16 to the second surface 50 of the hood inner panel 26 when the bumper 10 is in the second position (FIG. 2b illustrated position). Note that second surface 50 extends on both sides of the slot 40 illustrated in FIG. 2b.

Figure 3A:
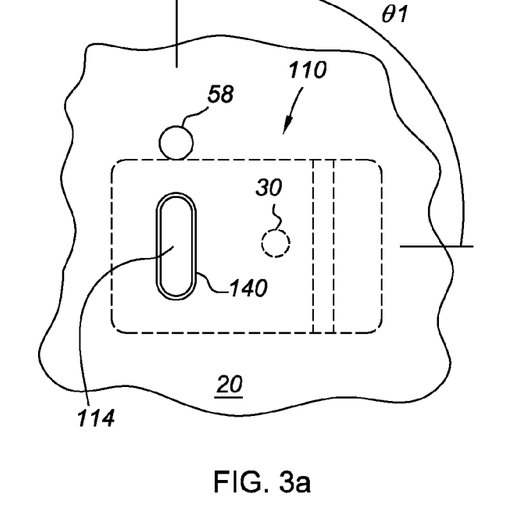
FIGS. 3a and 3b illustrate schematic views of the rotatably mounted bumper of FIG. 2 rotatably mounting to a panel consistent with the present invention.
Figure 3B:
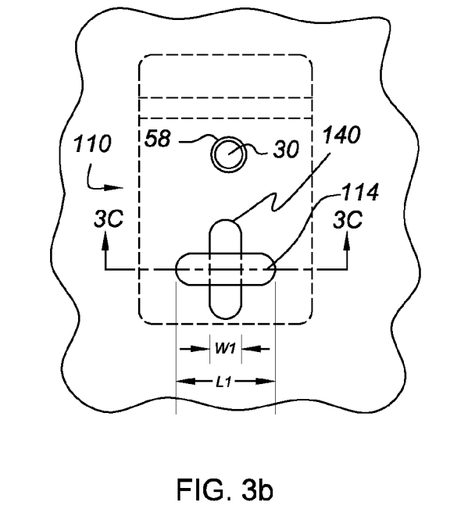

FIGS. 3a and 3b illustrate a schematic view of a rotatably-mounted bumper 110 similar in configuration to the bumper 10 of FIG. 1 but equipped with an alternate style registration member 30 depicted and discussed with FIG. 1b. FIG. 3a depicts the bumper 110 in the first position characterized by the head portion 114 of bumper 110 aligned with the slot 140 to permit the head portion 114 of the bumper 110 to be selectively insertable or removable from the slot 140 of the mounting member 20. The mounting member 20 includes a registration feature as a hole 58 sized and positioned to accept the registration member 30. In the particular exemplary case of FIG. 2b discussed earlier, the mounting member 20 may be the hood inner panel 26 of FIG. 2b. In FIG. 3a the head portion 114 of the bumper 110 is sized and configured to be inserted into and through the mounting aperture or slot 140 of the mounting member 20 when the bumper 110 is in the first position (as illustrated in FIG. 3a). The bumper 110 may then be rotated about a portion of the slot 140 by a defined angle $\theta_1$ to place the bumper 110 into the second position (as illustrated in FIG. 3b) in which the head portion 114 has its major lengthwise dimension aligned crosswise to the lengthwise dimension of the slot 140 such that spaced opposing surfaces of the mounting member 20 (surfaces 150 and 152 of FIG. 3c) are captured between the head portion 114 and the body 116, thereby rotatably mounting the bumper 110 to the mounting member 20. When placed in the second position, the registration feature 30 is received into and engaged with the hole 58 in the mounting member 20. In FIG. 3b, the slot 140 in the mounting member 20 has a width W1.

Figure 3C:
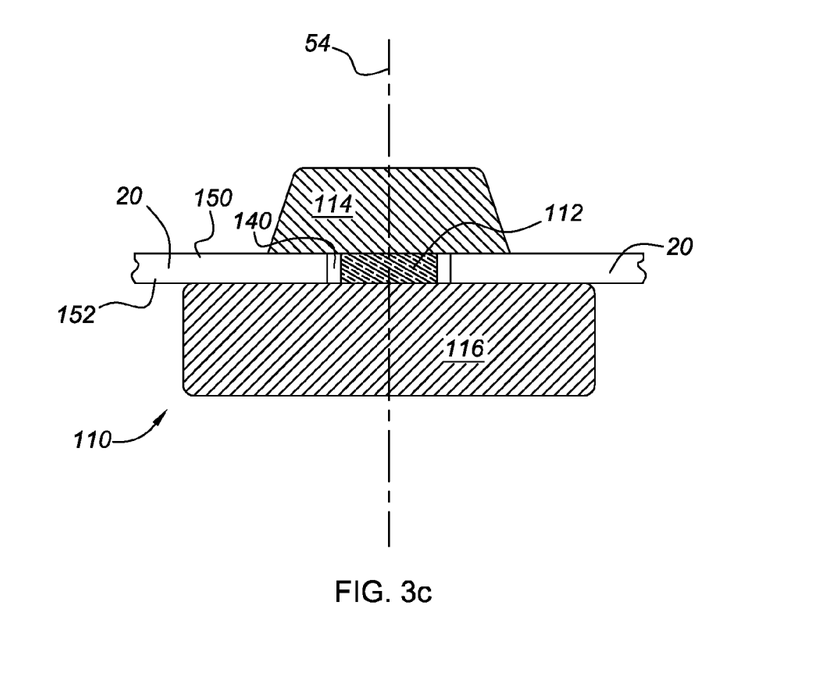
FIG. 3c illustrates a sectional view taken along 3C-3C of FIG. 3b.

FIG. 3c illustrates a sectional view taken along 3c-3c of FIG. 3b. The bumper body 116 is positioned against the first surface 152 of the mounting member 20. The head portion 114 has portions engaged against the opposing spaced second surface 150 of the mounting member 20 such that the mounting member 20 is retentively captured between the head portion 114 and body 116 of the bumper 110. The head portion 114 is configured to have a major length L1 (see FIG. 3b) that is greater than the width of the slot W1 (see FIG. 3b) such that portions of the head 114 can engage against the second surface 150 of the mounting member 20 when the bumper 110 is in the second position (or engagement position, illustrated in FIG. 3c). The head portion 114, shank portion 112 and slot 140 are aligned to a first axis 54 such that the peripheral shape of the head portion 114 normal to the first axis 54 substantially matches the shape of the mounting aperture or slot 140 (see FIG. 3a) when the bumper 110 is in the first position relative to the slot 140. The peripheral shape of the shank 112 normal to the first axis 54 is required to have a width less than the width W1 (see FIG. 3b) of the aperture or slot 140 so that the shank portion 112 can freely rotate in the mounting aperture or slot 140 between the first and second positions.

Figure 4:
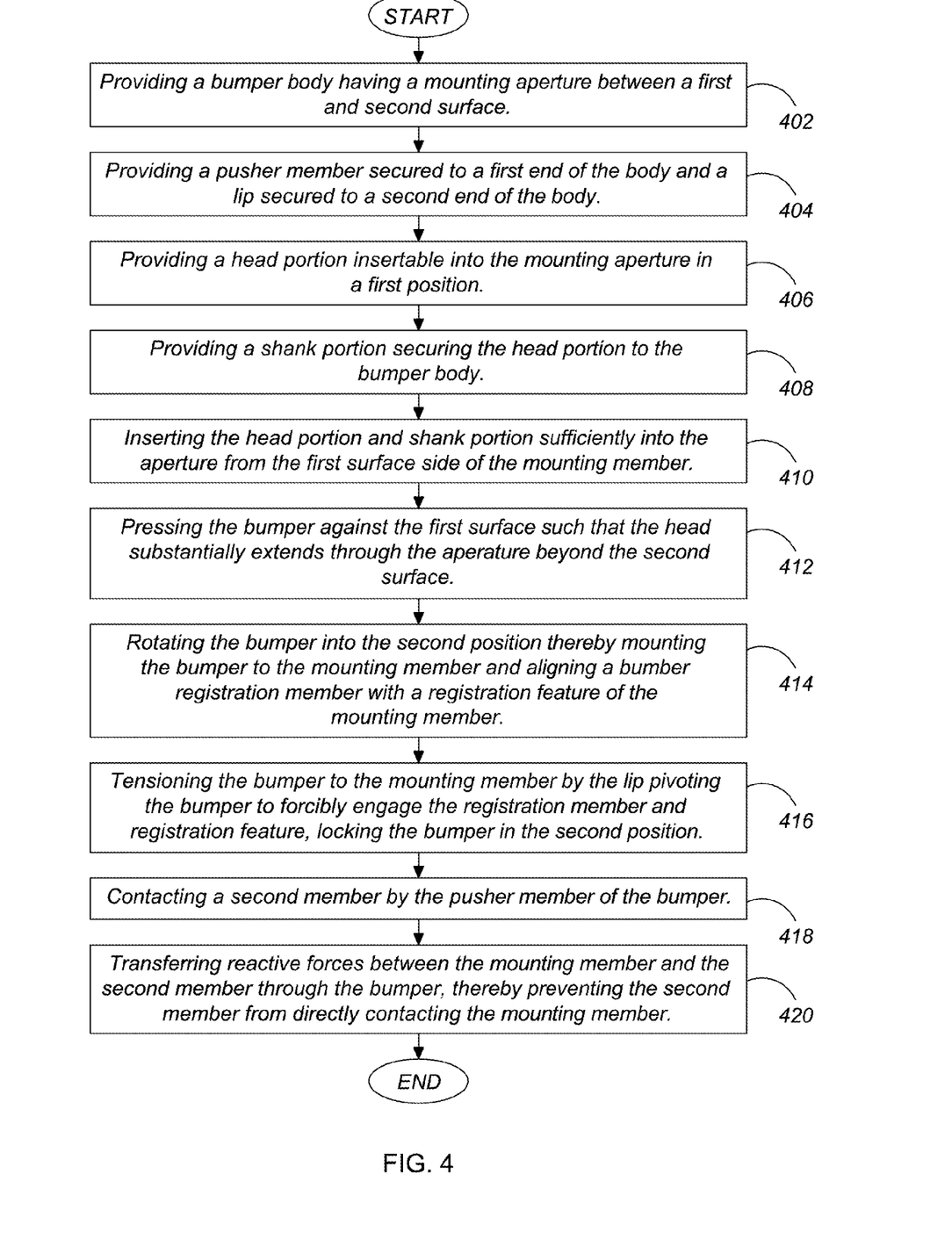
FIG. 4 illustrates a method of rotatably and ergonomically mounting a bumper to a mounting member.

FIG. 4 illustrates a method of rotatably and ergonomically mounting a bumper to a mounting member. The method begins at step 402 by forming a mounting aperture in a first surface of the moveable mounting member, the aperture extending through to a second surface of the mounting member, the second surface spaced apart from the first surface. Then, at block 404, a bumper body is provided having a pusher member secured to a first end of the body and a lip secured to an opposing second end of the body. At block 406, a head portion is provided wherein the head portion is sized and configured to be insertable into the aperture when in a first position relative to the aperture and to retentively engage the second surface after insertion into the aperture when the head portion is rotated to a second position relative to the aperture. Then, at block 408, a shank portion is provided and secured at a first end to the bumper body and secured at an opposing second end to the head portion, the shank portion having a peripheral shape that is not greater than the a width of the aperture such that the shank portion can freely rotate in the aperture between the first and second positions. The method continues at block 410 with inserting the head portion in the first position and a portion of the shank portion sufficiently into the aperture from the first surface side of the mounting member. Then, at block 412, the bumper is pressed against the first surface such that the head substantially extends through the aperture beyond the second surface. At block 414, the bumper is rotated about the aperture into the second position wherein the head retentively engages the second surface thereby mounting the bumper to the mounting member and aligning a registration member of the bumper with a registration feature of the mounting member. At block 416, the bumper is tensioned to the mounting member by action of the lip pressing against the mounting member to forcibly pivot the bumper to forcibly engage the registration member and the registration feature, the engagement acting to lock the bumper in the second position. At block 418, the pusher member contacts a portion of the second member. Then, at block 420, reactive forces are transferred between the mounting member and the second member through the bumper, thereby preventing the second member from directly contacting the mounting member.

Figure 5:
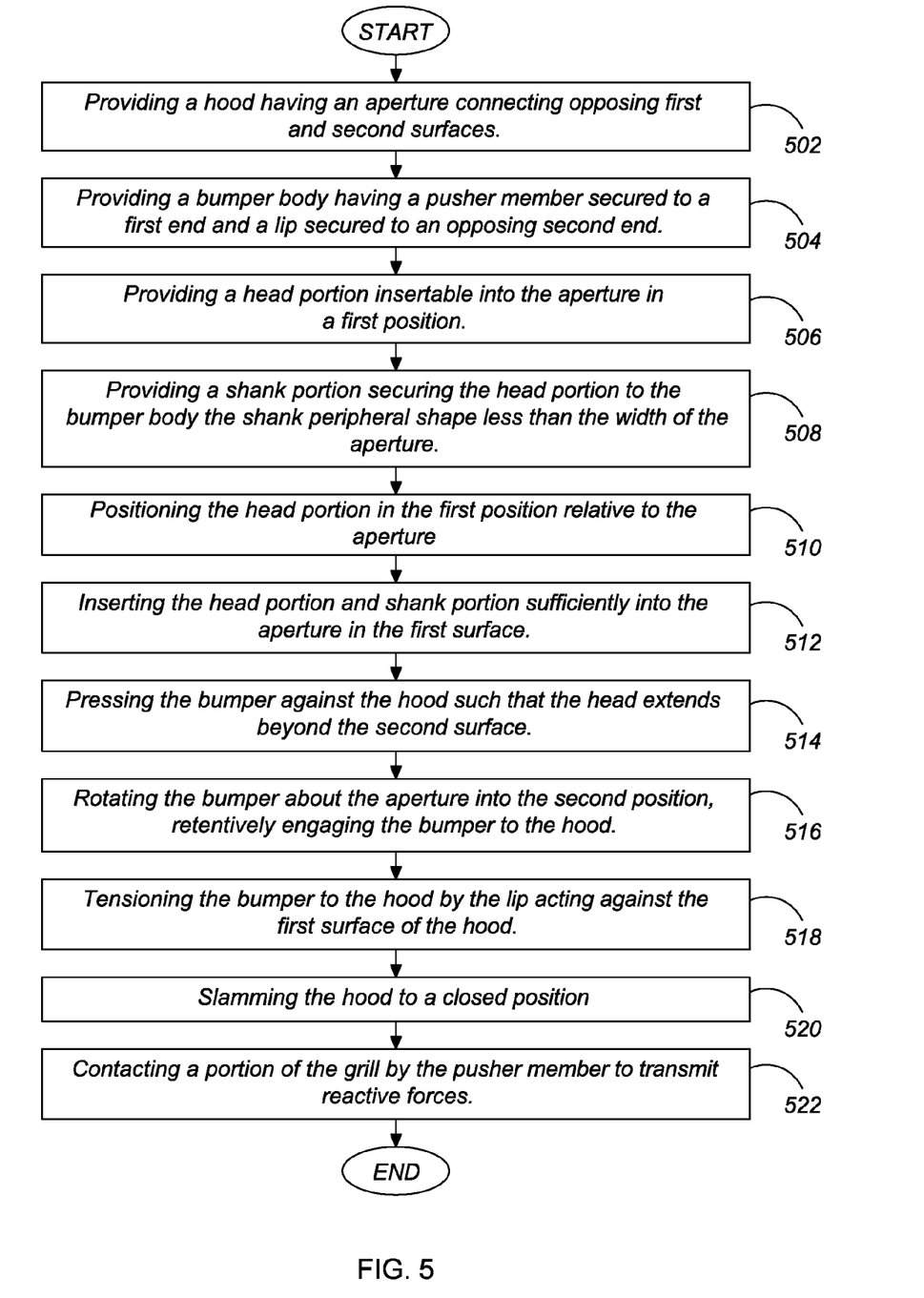
FIG. 5 illustrates a method of preventing a vehicle hood from contacting a vehicle grille when the hood is slammed.

FIG. 5 illustrates a method of preventing a vehicle hood from contacting a vehicle grille when the hood is slammed. The method begins at step 502 by providing a hood having an aperture formed in a first surface of a forward portion of the hood, the aperture extending through to a second surface of the hood. Then at block 504 a bumper body is provided having a compressible cushioning pusher member secured to a first end of the body and a lip secured to an opposing second end of the body. At block 506 a head portion is provided, the head portion is sized and configured to be insertable into the aperture when in a first position and to retentively engage against the second surface when in a second position. Then at block 508 a shank portion is provided. The shank portion is secured at a first end to the bumper body and secured at an opposing second end to the head portion so as to mount the head portion to the bumper body. The shank portion has a peripheral shape that is not greater than a width of the aperture such that the shank portion can freely rotate in the aperture between the first and second positions. At block 510 the head portion is positioned into the first position relative to the aperture. Then at block 512 the method continues by inserting the head portion and a portion of the shank portion sufficiently into the aperture from the first surface side of the hood. At block 514 the bumper is pressed against the first surface of the hood such that the head substantially extends beyond the aperture in the second surface. The method continues at block 516 by rotating the bumper about the aperture into the second position wherein the head retentively engages the second surface thereby mounting the bumper to the first surface of the hood. At block 518 the bumper is tensioned to the hood action of the lip pressing against the first surface of the hood to compressibly tension the head against the second surface of the hood, thereby tensibly holding the bumper retentively secured to the hood. Then at block 520 the method continues by slamming the hood to a closed position. At block 522 the method ends by contacting a portion of the grille by the pusher member to transmit reactive forces between the hood and grille, thereby preventing the hood from contacting the grille.

While the best modes for carrying out the invention have been described in detail, those familiar with the art to which this invention relates will recognize various alternative designs and embodiments for practicing the invention within the scope of the appended claims.

The invention claimed is:

1. A rotatably-mountable bumper and hood for a vehicle, comprising:
    a bumper body having two opposing ends; and
    a fastening member secured to said bumper body between said opposing ends, said fastening member having a first portion insertable into a mounting aperture in the vehicle hood when said bumper body is in a first position relative to said aperture, and said bumper body being rotatable to a second position relative to said aperture in which said first portion engages the hood through said aperture to removably and ergonomically mount said rotatably mountable bumper to said vehicle hood;
    wherein said rotatably-mountable bumper has elasticity and is configured to prevent the vehicle hood from contacting a vehicle grille when the hood is slammed.

2. The rotatably-mountable bumper and hood of claim 1, further comprising:
    a cushioning pusher member positioned at one end of said body, wherein said pusher member is configured to contact a portion of the vehicle grille when the hood transitions from an open to a closed position, thereby preventing the hood from contacting the grille.

3. The rotatably-mountable bumper and hood of claim 2, further comprising:
    a registration member on said body; and
    the vehicle hood further having a registration feature positioned and configured to retentively engage said registration member so as to retain said bumper body in said second position.

* * * * *